United States Patent
Ishii et al.

[11] Patent Number: 5,593,364
[45] Date of Patent: Jan. 14, 1997

[54] SHIFT CONTROL APPARATUS FOR AUTOMATIC TRANSMISSION

[75] Inventors: Shigeru Ishii, Atsugi; Yoshihide Shinso, Zama; Kosei Murata, Tsuchiura; Shigeki Shimanaka, Hadano; Shuji Kurokawa, Machida; Hideharu Yamamoto, Odawara, all of Japan

[73] Assignee: Nissan Motor Co., Ltd., Yokohama, Japan

[21] Appl. No.: 430,717

[22] Filed: Apr. 28, 1995

[30]  Foreign Application Priority Data

Apr. 28, 1994 [JP] Japan ................................... 6-092031

[51] Int. Cl.$^6$ ........................................... B60K 41/10
[52] U.S. Cl. .................................................. 477/98
[58] Field of Search ....................................... 477/98

[56]  References Cited

U.S. PATENT DOCUMENTS 5,069,084  12/1991  Matsumo et al. ..................... 477/98
5,261,295  11/1993  Iwanaga et al. ...................... 477/98
5,275,069  1/1994   Baba et al. .......................... 477/98

FOREIGN PATENT DOCUMENTS 62-74726  4/1987  Japan .

OTHER PUBLICATIONS

"Service Manual for Nissan RE5R01A–Type Full–Range Electronically–Controlled Automatic Transmission", Nissan Motor Co., Ltd., p. A–7, Mar. 1989.

Primary Examiner—Dirk Wright
Attorney, Agent, or Firm—Foley & Lardner

[57]  ABSTRACT

A shift control apparatus for an automatic transmission provides a normal-temperature shift pattern and a high-temperature shift pattern. The high-temperature shift pattern is selected when a temperature of hydraulic oil for the transmission satisfies a predetermined condition. Once the high-temperature shift pattern has been selected, the apparatus inhibits the switching to the high-temperature shift pattern for a predetermined duration, thereby to avoid an excessively frequent hunting between the shift patterns.

4 Claims, 4 Drawing Sheets

FIG_1

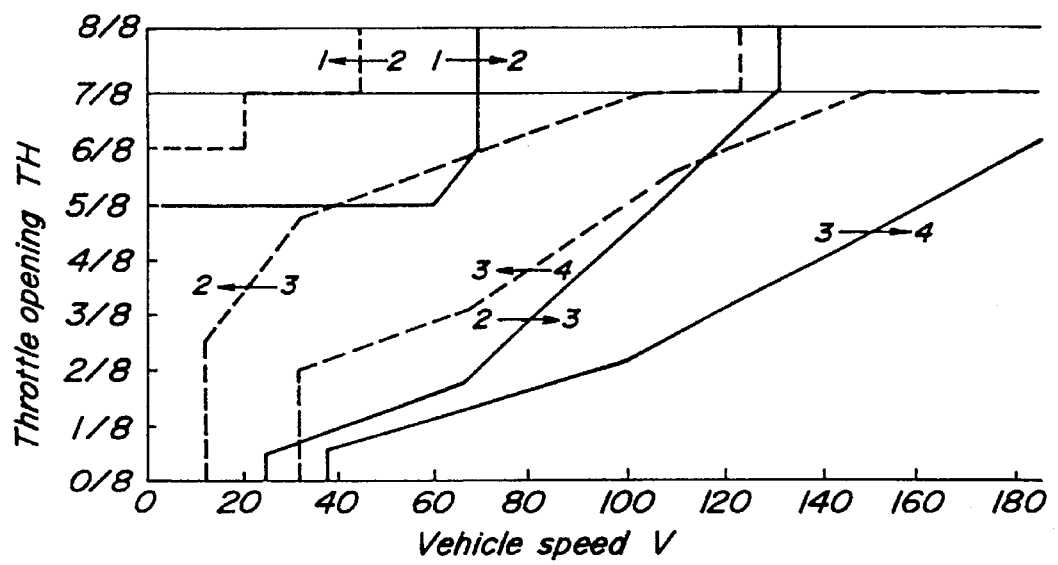
FIG_4A
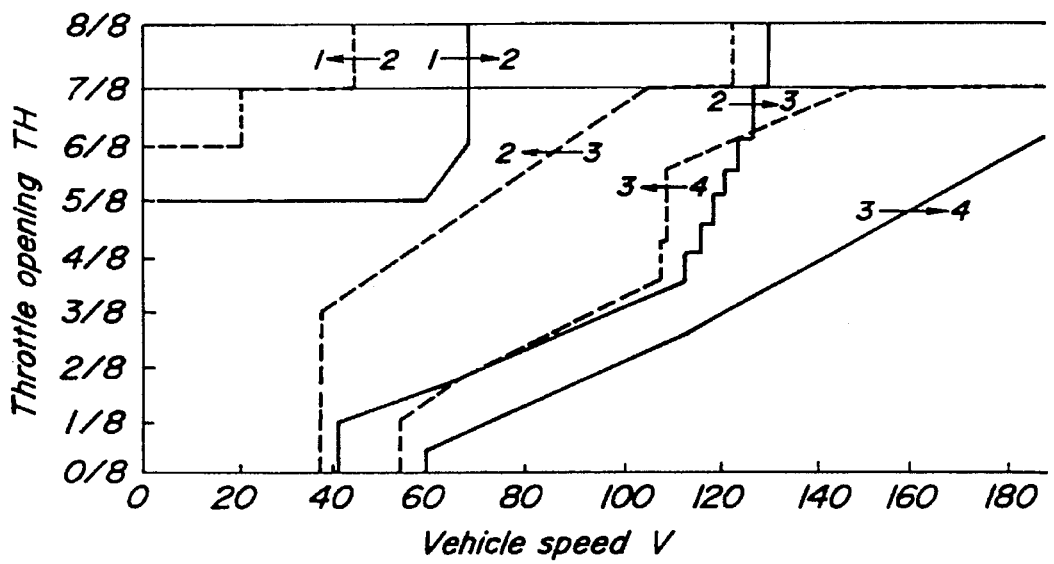
FIG_4B

SHIFT CONTROL APPARATUS FOR AUTOMATIC TRANSMISSION

BACKGROUND OF THE INVENTION

1. Field of the Present Invention

The present invention relates to a shift control apparatus for an automatic transmission, which performs a shift operation of the transmission in accordance with the driving state of an automotive vehicle.

2. Description of the Related Art

An automatic transmission selects a speed range by selectively engaging various friction devices (e.g., clutches and brakes, etc.) and performs the speed change (the up-shift speed change and the down-shift speed change) to obtain any other speed (the position of the gear) by engaging or disengaging the friction devices. It is a conventional practice to predetermine a plurality of shift patterns corresponding to various parameters related to the driving state of the vehicle, such as vehicle speed, throttle opening, temperature of transmission oil and the like, to select a particular shift pattern appropriate for a current driving state, and to perform the shift control on the basis of the selected pattern.

There is known an automatic transmission provided with a mode change-over switch adapted to be selected and operated by a driver, which includes an "AUTO" position, a "POWER" position, and a "SNOW" position. When the "POWER" position is selected, the shift pattern is fixed to an acceleration-oriented "power pattern". When the "SNOW" position is selected, the shift pattern is fixed to a "snow pattern" suitable for a snowy road. When the "AUTO" position is selected, i.e., when neither "POWER" position nor "SNOW" position is selected, the shift pattern is automatically switched to either one of the above-mentioned "power pattern" and an economy-oriented "economy pattern" in accordance with the driving state. Such an automatic transmission is disclosed, for example, in "Service Manual for NISSAN RE5R01A-Type Full-Range Electronically-Controlled Automatic Transmission" page A-7, issued in March 1989 by Nissan Motor Co., Ltd, the assignee of this application.

There is also known an automatic transmission having an ordinary-temperature shift pattern and a high-temperature shift pattern, which can be selected depending upon the temperature related to the transmission or the engine, typically the transmission fluid temperature. In this instance, an automatic transmission controller constantly monitors the transmission fluid temperature and prevents it from being extremely elevated by performing a switching from the ordinary-temperature shift pattern to the high-temperature shift pattern when the transmission fluid temperature becomes higher than a predetermined temperature. The relationship between the ordinary-temperature shift pattern and the high-temperature shift pattern substantially corresponds to the relationship between the above-described "economy pattern" and "power pattern", in that the shift point of the high-temperature shift pattern as compared to that of the normal-temperature shift pattern is set to a higher speed side to perform a shifting operation at a higher speed under the same conditions of the vehicle speed and the transmission fluid temperature. Such an automatic transmission is disclosed, for example, in Japanese Patent Laid-open Publication No. 62-74,726.

In the prior art automatic transmission that performs switching between a plurality of shift patterns in accordance with the transmission fluid temperature, among various parameters related to the switching of the shift pattern, including the vehicle speed, the throttle opening, and the transmission fluid temperature, it should be noted that the transmission fluid temperature is a parameter that varies independently of the driver's operation. Thus, even in the absence of driver's operations and there is no change in the vehicle speed V and the throttle opening TH, there may occur a hunting, i.e., an undesirable or unintended frequent switching between the normal temperature shift pattern illustrated in FIG. 4A and the high-temperature shift pattern illustrated in FIG. 4B as the transmission fluid temperature varies. Such switching gives unpleasant feel to the driver and/or passengers of the vehicle.

Further, the above-described undesired switching between the different shift patterns may also occur as a result of a hunting of the high-temperature judging logic due to noise or the like from an transmission fluid temperature sensor for detecting the transmission fluid temperature.

SUMMARY OF THE INVENTION

It is therefore an object of the present invention to provide an improved shift control apparatus for an automatic transmission, that performs switching between a plurality of shift patterns in accordance with the transmission fluid temperature, without causing a hunting between the shift patterns.

The present invention is based on a novel concept that the hunting between the shift patterns can be effectively avoided by inhibiting the switching of the shift pattern for a predetermined duration and maintaining the previously selected shift pattern for the predetermined duration when the shift pattern has been changed-over.

According to the present invention, there is provided a shift control apparatus for an automatic transmission comprising: a normal-temperature shift control means for providing a first shift pattern and performing a shift operation under a normal temperature condition, based on said first shift pattern; a high-temperature shift control means for providing a second shift pattern and performing a shift operation under a high temperature condition, based on said second shift pattern; a temperature detecting means for detecting a temperature relating to at least one of the automatic transmission and an engine connected to said automatic transmission; a high-temperature judging means for judging whether or not the temperature detected by said temperature detecting means is higher than a predetermined temperature; a shift pattern switching means for performing a switching between said normal-temperature shift control means and said high-temperature shift control means, and activating said high-temperature shift control means when the temperature detected by said temperature detecting means has been judged to be higher than said predetermined temperature; a shift pattern switching detecting means for detecting the switching between said normal-temperature shift control means and said high-temperature shift control means by said shift pattern switching means; and a shift pattern switching inhibiting means for inhibiting the switching between said normal-temperature shift control means and said high-temperature shift control means by said shift pattern switching means, for a predetermined duration after the switching between said normal-temperature shift control means and said high-temperature shift control means has been detected.

With the above-mentioned arrangement of the present invention, when the temperature detected by the temperature detecting means is above a predetermined temperature and judged by the high-temperature judging means to be higher than the predetermined temperature, the high-temperature shift control means is activated by the shift pattern switching means, and the shift pattern switching inhibiting means inhibits the switching of the shift pattern by the shift pattern switching means for a predetermined duration after the shift pattern switching has been detected by the shift pattern switching detecting means. The present invention thus serves to prevent for the predetermined duration the occurrence of the above-described undesired frequent switching between different shift patterns by the shift pattern switching as a result of variation in the transmission fluid temperature or hunting of the high-temperature judging logic due to the noise from the temperature sensor or the like. It is thus possible to preserve driver's and/or passengers' comfort.

Advantageously, the temperature to be detected by the temperature detecting means is a working fluid temperature of the automatic transmission. In this instance, the predetermined temperature may be at least approximately 124° C.

Furthermore, the predetermined duration in which the switching between the different shift patterns is inhibited may be at least approximately 10 seconds.

BRIEF DESCRIPTION OF THE DRAWINGS

The present invention will now be described in further detail hereinafter, by referring to a specific embodiment shown in the accompanying drawings, in which:

FIGS. 4A and 4B are graphs showing a normal temperature shift pattern and a high-temperature shift pattern used for the shift control of the automatic transmission to which the present invention may be applied.

DETAILED DESCRIPTION OF THE PREFERRED EMBODIMENT

Figure 1:
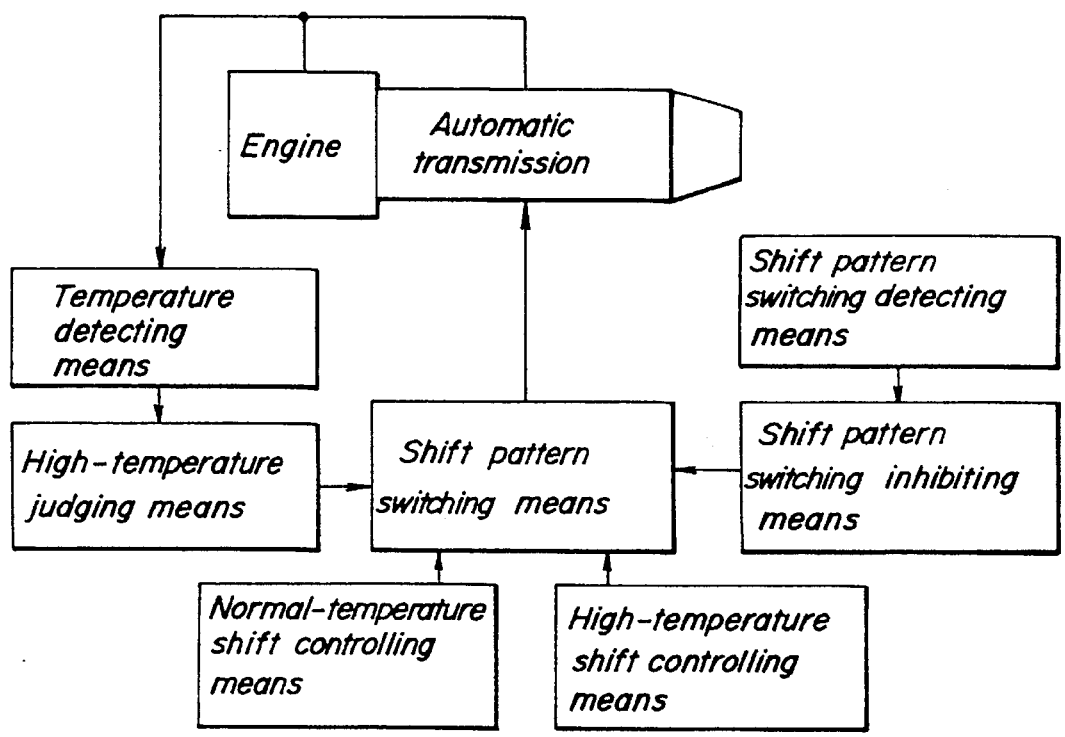
FIG. 1 is a diagram for explaining the basic concept of the present invention.

Referring now to FIG. 1, there is shown a basic concept of the present invention. The shift control apparatus according to the present invention is for an automatic transmission driven by an engine. The shift control apparatus includes, as shown in FIG. 1, a normal-temperature shift control means for providing a first shift pattern and performing a shift operation of the transmission under a normal temperature condition, based on the first shift pattern, and a high-temperature shift control means for providing a second shift pattern and performing a shift operation of the transmission under a high temperature condition, based on the second shift pattern. A temperature detecting means serves to detect a temperature related to at least one of the automatic transmission and an engine connected to the automatic transmission. A high-temperature judging means serves to judge whether or not the temperature detected by the temperature detecting means is higher than a predetermined temperature. A shift pattern switching means serves to perform a switching between the normal-temperature shift control means and the high-temperature shift control means, and activates the high-temperature shift control means when the temperature detected by the temperature detecting means has been judged to be higher than the predetermined temperature. A shift pattern switching detecting means serves to detect the switching between the normal-temperature shift control means and the high-temperature shift control means by said shift pattern switching means. A shift pattern switching inhibiting means serves to inhibit the switching between the normal-temperature shift control means and the high-temperature shift control means by the shift pattern switching means, for a predetermined duration after the switching between the normal-temperature shift control means and the high-temperature shift control means has been detected.

Figure 2:
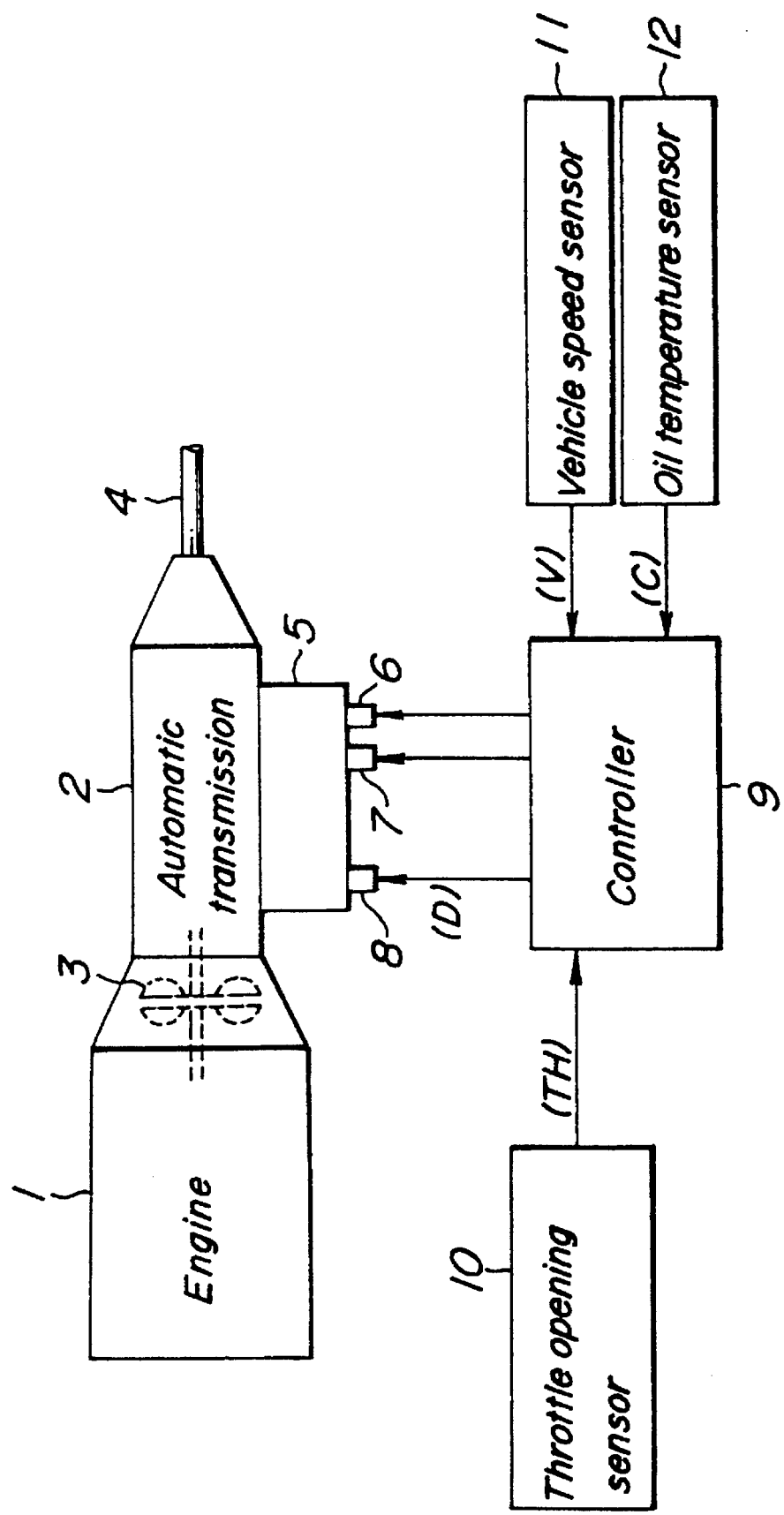
FIG. 2 is a diagram showing the constitution of a preferred embodiment of a shift control apparatus according to the present invention.

FIG. 2 is a diagrammatic representation of the shift control apparatus according to one embodiment the present invention, wherein reference numeral 1 denotes an engine connected to an automatic transmission 2. The automatic transmission 2 receives an output power from the engine 1 through a torque converter 3 and changes the input revolutional speed into the output revolutional speed of an output shaft 4, with a gear ratio according to a speed range being selected.

The speed range of the automatic transmission 2 is determined by a combination of ON and OFF states of shift solenoids 6 and 7 within a control valve 5, and the torque converter 3 selectively assumes a converter mode in which the input and output elements are not directly connected to each other, and a lock-up mode in which the input and output elements are directly connected to each other by a duty control of a lock-up solenoid 8 within the control valve 5. The following explanations will be made assuming that the automatic transmission 2 has a D range currently selected.

There is provided a controller 9 for controlling the ON/OFF states of the shift solenoids 6 and 7 and the driving duty D of the lock-up solenoid 8. The controller 9 is supplied with an input signal from a throttle opening sensor 10 for detecting a throttle opening TH of the engine 1, an input signal from a vehicle speed sensor 11 for detecting a vehicle speed V from the revolutional speed of the transmission output shaft 4, and an input signal from an oil temperature sensor 12 for detecting a transmission fluid temperature C.

Figure 3:
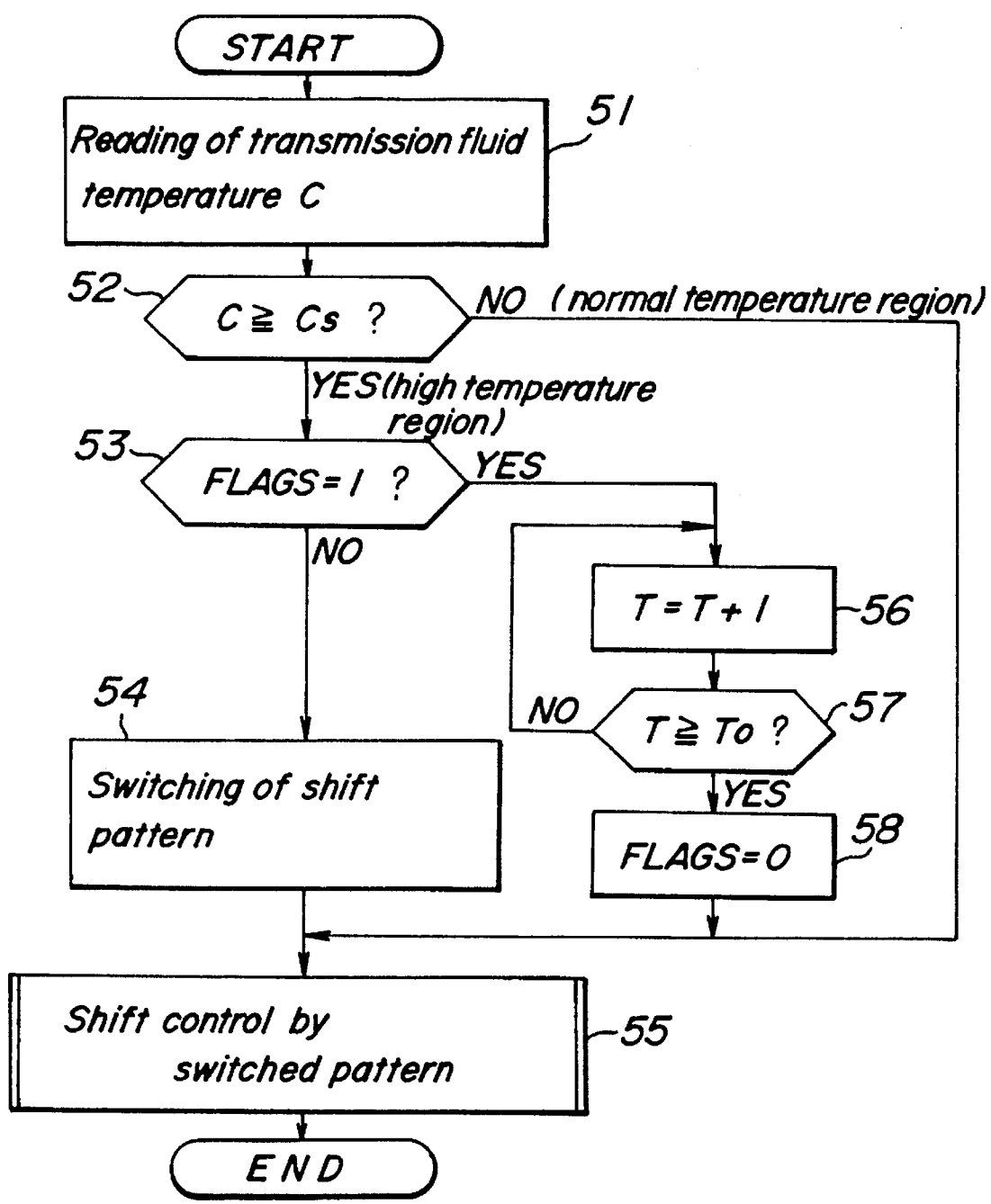
FIG. 3 is a flowchart showing a control program of a change-speed control carried out by a controller according to the same embodiment of the present invention.

The controller 9 performs a shift control intended by the present invention, by executing a control program shown in FIG. 3. Besides, the controller 9 performs the lock-up control by executing a lock-up control program (not shown) on the basis of the input information. The lock-up control may be of a normal type control wherein a judgment is made as to which of the lock-up region and the converter region the current driving state belongs, based on the throttle opening TH, and the vehicle speed V and in accordance with a look-up method that uses a table data corresponding to a lock-up vehicle speed diagram (not shown). A duty control is carried out with the driving duty D of the lock-up solenoid 8 determined in accordance with the judgment result, so as to selectively obtain the lock-up mode or the converter mode of the torque converter.

FIG. 3 is a flowchart showing a shift control program of which is repeatedly executed by the fixed time interruption of the controller 9. First of all, in the step 51 of FIG. 3, the transmission fluid temperature C is read by the temperature sensor 12, and a judgment is made in the subsequent step 52 as to whether the detected temperature C is not less than a predetermined temperature Cs and thus belongs to a high-temperature region. Here, it is assumed that the predetermined temperature Cs is set to a temperature (approximately 124° C., for example) that is unlikely attained by the heating in the lock-up mode under a normal driving condition. Therefore, the step 52 is to monitor whether the transmission fluid temperature C belongs to the high-temperature region that is unlikely achieved during a normal driving condition, or whether the transmission fluid temperature C belongs to an normal temperature region.

When the transmission fluid temperature C has been judged to belong to the normal temperature region in the step 52, no switching of the shift control means upon increase in the temperature as intended by the present invention takes place, so that the control advances to the step 55 to perform a normal shift control with the current shift pattern, i.e., the normal temperature shift pattern indicated by the solid lines and broken lines in FIG. 4A. In the normal shift control, there is obtained an optimum speed range for the current driving state, e.g., from the table data corresponding to the normal temperature shift pattern, by using the look-up method in accordance with the throttle opening TH read by the throttle opening sensor 10 and the vehicle speed V read by the vehicle speed sensor 11, and the shift solenoids 6 and 7 are turned ON and OFF to achieve an optimum speed range.

On the other hand, when the transmission fluid temperature C has been judged to belong to the high-temperature region in the step 52, the switching of the shift control means upon increase in the temperature as intended by the present invention, regardless of existence or absence of change in the vehicle speed V and the throttle opening TH, so that the control advances to the step 53 to confirm the state of a shift pattern switching flag FLAGS. The shift pattern switching flag enters the set state (FLAGS=1) for a predetermined time $T_0$ after the switching of the shift pattern has been performed, and enters the reset state (FLAGS=0) in any other case. It is needless to say that FLAGS=0 is obtained during a normal driving condition in the normal temperature region.

Since FLAGS=0 is obtained immediately after the high temperature region substitutes for the normal temperature region due to an increase in the transmission fluid temperature C in the judgment at the step 53, the control advances to the step 54 from NO in the step 53. In the step 54, the switch from the currently selected normal temperature shift pattern to the high-temperature shift pattern is made and the shift pattern switching flag FLAGS is set (FLAGS=1). Further, in the subsequent step 55, the shift control for the high temperature is carried out by using the currently selected high-temperature shift pattern indicated by the solid lines and the broken lines in FIG. 4B. In the shift control for the high temperature region, a speed range optimum for the current driving state is obtained in accordance with the throttle opening TH read by the throttle opening sensor 10 and the vehicle speed V read by the vehicle speed sensor 11 by using a look-up method, e.g., from the table data corresponding to the high-temperature shift pattern, and a predetermined shift operation is carried out by turning ON and OFF the shift solenoids 6 and 7 such that an optimum speed range can be selected, thereby preventing the transmission fluid temperature C from being excessively elevated.

The switching of the above-described shift pattern may involve a change in the speed range that is not intended by the driver. In such a case, the driving state varies before and after the change in the speed range regardless of presence or absence of the driver's operation, so that the switching of the shift pattern and the resultant change in the speed range may be repeated within a short time, thereby giving unpleasant feel to the driver and/or passengers. As a countermeasure therefor, in the present embodiment, the hunting of the shift pattern switching control is prevented by inhibiting the switching to the high-temperature shift pattern for a predetermined time once the shift pattern has been switched.

That is to say, when the control cycle from the step 51 to the steps 54 and 55 through YES of the step 52 and NO of the step 53 is completed, if the transmission fluid temperature has been judged to belong to the high temperature region, the control advances from the step 51 to the step 56 through YES of the step 52 and YES of the step 53 in the next control cycle. In the step 56, a value T of a delay timer is subjected to increment (T=T+1). This increment is repeated until T becomes a value corresponding to a predetermined time $T_0$ (e.g., approximately 10 seconds) in the step 57, and when T becomes a value corresponding to the predetermined time $T_0$, the control advances to the step 55 after the shift pattern switching flag FLAGS is reset (FLAGS=0) in the subsequent step 58. The switching of the shift pattern is thus inhibited for approximately 10 seconds after the shift pattern has been once switched, and thereafter the switching of the shift pattern becomes possible.

In the above explanation, the controller 9 corresponds to the temperature detecting means, the high-temperature judging means, the shift pattern switching detecting means and the shift pattern switching means, respectively, in the steps 51 to 55, and to the shift pattern switching inhibiting means in the steps 56 to 57.

As described above, according to the illustrated embodiment, the switching to the high-temperature shift pattern is inhibited for 10 seconds after the shift pattern has been once switched, even when the transmission fluid temperature C satisfies the conditions for switching to the high-temperature shift pattern. Thus, it is possible to positively prevent excessively frequent shift operation involved by the switching of the shift pattern which is not intended by the driver. Furthermore, the switching from the normal temperature shift pattern to the high-temperature shift pattern is carried out when the transmission fluid temperature C is above the predetermined temperature Cs, thereby preventing the transmission fluid temperature from being excessively increased. Moreover, in the illustrated embodiment, since reading of the transmission fluid temperature is also inhibited for 10 seconds, no hunting of the high-temperature judging logic can be caused.

It will be appreciated from the foregoing description that the present invention provides an improved shift control apparatus for an automatic transmission that performs switching between a plurality of shift patterns in accordance with the transmission fluid temperature, without causing undesirable hunting between the shift patterns.

While the present invention has been described with reference to a specific embodiment, it is of course that various changes or modifications may be made without departing from the scope of the invention.

Thus, although the transmission fluid temperature of the automatic transmission has been detected in the illustrated embodiment, there may be used an engine coolant temperature. Furthermore, the predetermined duration in which the shift pattern switching is inhibited need not be fixed to a constant value such as 10 seconds, and it may be any variable corresponding to the vehicle driving state.

We claim:

1. A shift control apparatus for an automatic transmission comprising:

a normal-temperature shift control means for providing a first shift pattern and performing a shift operation under a normal temperature condition, based on said first shift pattern;

a high-temperature shift control means for providing a second shift pattern and performing a shift operation under a high temperature condition, based on said second shift pattern;

a temperature detecting means for detecting a temperature relating to at least one of the automatic transmission and an engine connected to said automatic transmission;

a high-temperature judging means for judging whether or not the temperature detected by said temperature detecting means is higher than a predetermined temperature;

a shift pattern switching means for performing a switching between said normal-temperature shift control means and said high-temperature shift control means, and activating said high-temperature shift control means when the temperature detected by said temperature detecting means has been judged to be higher than said predetermined temperature;

a shift pattern switching detecting means for detecting the switching between said normal-temperature shift control means and said high-temperature shift control means by said shift pattern switching means; and a shift pattern switching inhibiting means for inhibiting the switching between said normal-temperature shift control means and said high-temperature shift control means by said shift pattern switching means, for a predetermined duration after the switching between said normal-temperature shift control means and said high-temperature shift control means has been detected.

2. A shift control apparatus as set forth in claim 1, wherein said temperature to be detected by said temperature detecting means is a transmission fluid temperature of the automatic transmission.

3. A shift control apparatus as set forth in claim 2, wherein said predetermined temperature is at least approximately 124° C.

4. A shift control apparatus as set forth in claim 1, wherein said predetermined duration is at least approximately 10 seconds.

* * * * *